United States Patent
Cho et al.

(10) Patent No.: US 10,537,220 B2
(45) Date of Patent: Jan. 21, 2020

(54) CYCLONE DUST COLLECTOR AND VACUUM CLEANER HAVING THE SAME

(71) Applicant: Samsung Electronics Co., Ltd., Suwon-si, Gyeonggi-do (KR)

(72) Inventors: Dong Jin Cho, Hwaseong-si (KR); Yun Soo Jang, Suwon-si (KR); Han Jun Sung, Seoul (KR); Won Kyu Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 15/838,743

(22) Filed: Dec. 12, 2017

(65) Prior Publication Data

US 2018/0160871 A1    Jun. 14, 2018

(30) Foreign Application Priority Data

Dec. 13, 2016 (KR) .................. 10-2016-0169879

(51) Int. Cl.
*B01D 50/00* (2006.01)
*A47L 9/16* (2006.01)
(Continued)

(52) U.S. Cl.
CPC .......... *A47L 9/1683* (2013.01); *A47L 9/1666* (2013.01); *B01D 45/16* (2013.01); *B01D 46/24* (2013.01);
(Continued)

(58) Field of Classification Search
CPC .... A47L 9/1683; A47L 9/1666; A47L 9/1675; B01D 45/16; B01D 50/002; B01D 46/24;
(Continued)

(56) References Cited

U.S. PATENT DOCUMENTS 6,928,692 B2 * 8/2005 Oh .................. A47L 9/1666
15/352
7,351,269 B2 * 4/2008 Yau ..................... A47L 5/24
15/352
(Continued)

FOREIGN PATENT DOCUMENTS

EP    1776911 A2    4/2007
EP    1969986 A1    9/2008
(Continued)

OTHER PUBLICATIONS

International Search Report for PCT Patent Application No. PCT/KR2017/014382 dated Mar. 29, 2018; 3 pages.
(Continued)

Primary Examiner — Dung H Bui

(57) ABSTRACT

A vacuum cleaner disclosed that includes a cyclone dust collector. The vacuum cleaner includes a cyclone chamber configured to whirl air introduced from an inlet part to separate dust from the air and including an outlet part provided to discharge the air from which dust is separated from the cyclone chamber. The vacuum cleaner also includes a grill rotatably provided at the outlet part. The vacuum cleaner also includes a rotor including a first fan and a second fan configured to generate an air flow in a direction opposite an air flow direction of the first fan. The vacuum cleaner further includes a case in which the rotor is rotatable accommodated with a gap provided between the grill and the case. The case includes a plurality of holes, and includes a dust removal flow path to discharge air introduced from the plurality of holes through the gap.

20 Claims, 12 Drawing Sheets

(51) Int. Cl.
    *B04C 9/00*     (2006.01)
    *B01D 46/24*     (2006.01)
    *B01D 45/16*     (2006.01)

(52) U.S. Cl.
    CPC .............. *B01D 50/002* (2013.01); *B04C 9/00* (2013.01); *A47L 9/1675* (2013.01); *B01D 46/2403* (2013.01); *B04C 2009/004* (2013.01); *B04C 2009/007* (2013.01)

(58) Field of Classification Search
    CPC . B01D 46/2403; B04C 9/00; B04C 2009/004; B04C 2009/007
    See application file for complete search history.

(56) References Cited

U.S. PATENT DOCUMENTS 9,011,564 B2     4/2015    de Wit et al.

2016/0278592 A1*    9/2016    Cho ........................ A47L 5/362
2017/0188769 A1*    7/2017    Cho ........................... A47L 5/36

FOREIGN PATENT DOCUMENTS

| | | |
|---|---|---|
| EP | 3072431 A1 | 9/2016 |
| GB | 2358347 A | 7/2001 |
| GB | 2389064 A | 12/2003 |
| JP | 2010-94438 A | 4/2010 |
| KR | 100767123 B1 | 10/2007 |
| KR | 10-2009-0118804 A | 11/2009 |
| KR | 10-2014-0113308 A | 9/2014 |
| KR | 101486860 B1 | 1/2015 |
| KR | 10-2017-0079579 A | 7/2017 |

OTHER PUBLICATIONS

European Patent Office, "Supplementary European Search Report," Application No. EP 17880560.2, dated Jul. 26, 2019, 7 pages.

* cited by examiner

CYCLONE DUST COLLECTOR AND VACUUM CLEANER HAVING THE SAME

CROSS-REFERENCE TO RELATED APPLICATIONS AND CLAIM OF PRIORITY

This application is related to and claims priority to Korean Patent Application No. 10-2016-0169879, filed on Dec. 13, 2016, the contents of which are incorporated herein by reference.

TECHNICAL FIELD

Embodiments of the present disclosure relate to a vacuum cleaner, and more particularly, to a cyclone dust collector with improved usability and a vacuum cleaner having the same.

BACKGROUND

A vacuum cleaner is an apparatus that suctions air using a suction force generated by a fan and a motor and filters foreign matter in the suctioned air so that cleaning is performed.

In order to filter foreign matter in the suctioned air, the vacuum cleaner includes a dust collecting unit so that the foreign matter is filtered by a certain filtering device. In the type of the filtering device for filtering the foreign matter in the dust collecting unit, there are a porous filtering unit in which foreign matter is forcibly filtered while air passes through a porous filter and a dust collecting unit in a cyclone method in which foreign matter is filtered during a cyclonic air flow.

A cyclone dust collector may be widely used in a canister type cleaner, an upright type cleaner, a hand vacuum cleaner, and the like.

The cyclone dust collector may include an inlet part into which air is introduced and an outlet part through which air is discharged to the outside. The air which is introduced through the inlet part and in which dust is filtered may be discharged to the outside through the outlet part.

SUMMARY

To address the above-discussed deficiencies, it is a primary object to provide a cyclone dust collector with improved usability and a vacuum cleaner having the same.

It is another aspect of the present disclosure to provide a cyclone dust collector having a simplified structure so that production costs thereof are reduced and productivity thereof is improved.

According to an aspect of the present disclosure, a vacuum cleaner comprising a cyclone dust collector, wherein the cyclone dust collector includes: a cyclone chamber configured to whirl air introduced from an inlet part to separate dust from the air and including an outlet part provided to discharge the air, from which dust is separated, from the cyclone chamber; a grill rotatably provided at the outlet part; a rotor including a first fan on which the grill is mounted and which is rotatably provided and a second fan provided to generate an air flow in a direction opposite an air flow direction of the first fan; a case in which the rotor is rotatably accommodated; and a gap provided between the grill and the case, wherein a plurality of holes are formed in the case, and the case includes a dust removal flow path formed to discharge air introduced from the plurality of holes through the gap.

The plurality of holes may be formed in an outer circumferential surface of the case.

The vacuum cleaner may further include a bearing provided between the case and the rotor.

The case may include a first case connected to the outlet part and a second case configured to extend from the first case and provided so that the rotor is rotatably accommodated therein, and the plurality of holes are disposed in the second case.

The cyclone chamber may include a main flow path formed between the grill and the outlet part, and configured to discharge air introduced into the first fan.

The main flow path and the dust removal flow path may be separated from each other.

The rotor may be rotated by a suction force.

The grill may include at least one of a hemispheric shape, a conical shape, a circular shape, a planar shape, and a cylindrical shape.

The second case may include a bearing mounting part on which the bearing is mounted.

The rotor may include a first rotor to which the grill is coupled and a second rotor configured to extend from the first rotor and provided with the bearing at an outer side thereof, and the second fan may be disposed at an outer side of the first rotor.

The second rotor may include a bearing coupling part formed to be coupled to the bearing.

The cyclone chamber may include a cover provided to be openable and closable, and the cover may further include a guide for guiding dust which is separated by whirling air.

The guide may be formed to be inclined from a center of the guide to the outer side thereof as a center of the cover is more recessed than an edge of the cover.

The cyclone chamber may include a discharge pipe which is connected to the outlet part, and a sealing member may be provided to seal between the case and the discharge pipe.

According to another aspect of the present disclosure, a cyclone dust collector includes a cyclone chamber configured to whirl air introduced from an inlet part to separate dust from the air and including an outlet part provided to discharge the air from which dust is separated from the cyclone chamber; a grill rotatably provided at the outlet part; a rotor including a first fan on which the grill is mounted and which is rotatably provided and a second fan provided to generate an air flow in a direction opposite an air flow direction of the first fan; a case in which the rotor is rotatably accommodated and a plurality of holes are formed to introduce air; a gap provided between the grill and the case; a bearing provided between the case and the rotor; and a dust removal flow path formed to discharge the air introduced from the plurality of holes through the gap.

The case may include a first case connected to the outlet part and a second case configured to extend from the first case and provided with the rotor rotatably accommodated therein, and the plurality of holes are disposed in the second case.

The cyclone chamber may include a main flow path formed between the grill and the outlet part, and configured to discharge air introduced into the first fan, and the main flow path and the dust removal flow path are separated from each other.

The grill may include at least one of a hemispheric shape, a conical shape, a circular shape, a planar shape, and a cylindrical shape.

The rotor may include a first rotor to which the grill is coupled and a second rotor configured to extend from the first rotor and provided with the bearing at an outer side thereof, and the second fan may be disposed at an outer side of the first rotor.

The cyclone chamber may include a discharge pipe connected to the outlet part, and a sealing member may be provided to seal between the case and the discharge pipe.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
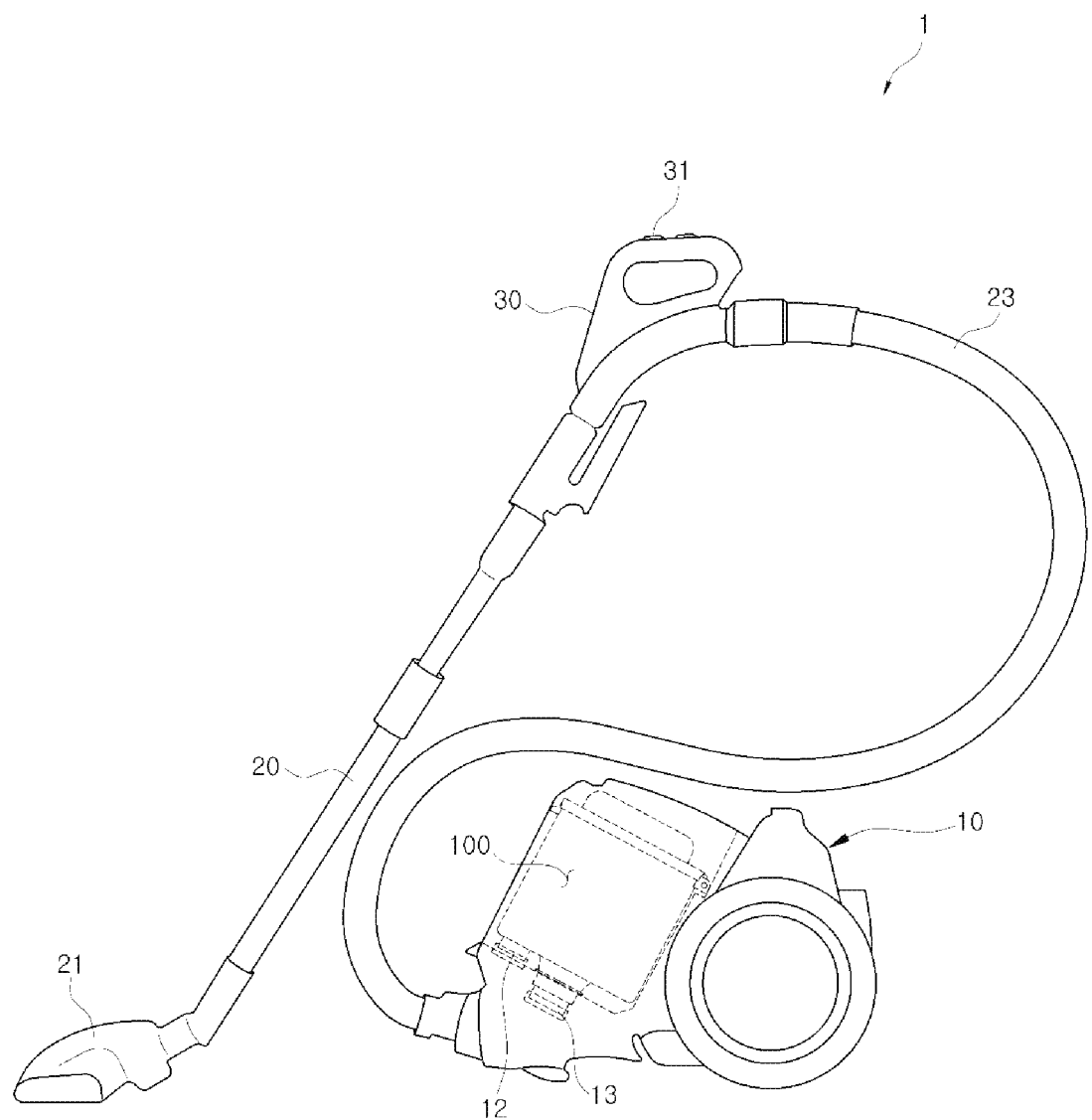
FIG. 1 illustrates a view of a vacuum cleaner provided with a cyclone dust collector according to one embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals or symbols presented in the drawings of the application indicate parts or elements that perform substantially the same functions.

Terms used herein are for describing the embodiments and are not intended to limit the present disclosure. A singular expression includes a plural expression unless the context clearly indicates otherwise. In the application, the term such as "include" or "have" should be understood as specifying the presence of features, numbers, steps, operations, elements, parts, or combinations thereof and should not be understood as precluding the presence or addition of one or more other features, numbers, steps, operations, elements, parts, or combinations thereof in advance.

The terms including ordinals such as "first" and "second" used herein may be used to describe various elements, but the elements are not limited by the terms. The terms are only used for the purpose of distinguishing one element from another element. For example, a first element may be referred to as a second element while not departing from the scope of the present disclosure, and likewise, a second element may also be referred to as a first element. The term "and/or" includes any combination of a plurality of related listed items or any one item among the plurality of related listed items.

Hereinafter, embodiments according to the present disclosure will be described in detail with reference to the accompanying drawings.

The terms "front surface" and "front side" used below refer to a direction toward a front surface and a front side based on a forward view of the vacuum cleaner 1 shown in FIG. 1, and the term "rear side" refers to a direction toward a rear side of the vacuum cleaner 1. Although being described as being applied to a canister type vacuum cleaner, the cyclone dust collector according to one embodiment of the present disclosure is applicable to all types of vacuum cleaners such as upright, stick, robot cleaners, and also applicable to all types of dust canisters such as a single cyclone, a multi-cyclone, and the like.

FIG. 1 illustrates a view of a vacuum cleaner provided with a cyclone dust collector according to one embodiment of the present disclosure.

As shown in FIG. 1, the vacuum cleaner 1 may include a canister type vacuum cleaner. The vacuum cleaner 1 may include a main body 10, a cyclone dust collector 100 which is mounted on the main body 10, and a suctioning part 21 for suctioning dust and air while being in contact with a surface to be cleaned.

The cyclone dust collector 100 may generate a whirling air current so that air and dust are separated from each other by centrifugal force.

The main body 10 includes a fan motor (not shown) for generating a suction force. The suctioning part 21 may suction air and dust from the surface to be cleaned with the suction force generated by the main body 10.

An extension pipe 20, a handle 30 manipulated by a user, and a flexible hose 23 made of a flexible material for free movement of the handle 30 may be provided between the main body 10 and the suctioning part 21. A manipulation part 31 may be provided in the handle 30 so that a function of the vacuum cleaner 1 is manipulated.

The suctioning part 21, the extension pipe 20, the handle 30, and the flexible hose 23 may all communicate with each other. The air and dust suctioned by the suctioning part 21 may sequentially pass through the extension pipe 20, the handle 30, and the flexible hose 23 and move to the main body 10.

A suctioning port 12 for guiding the suctioned air to the cyclone dust collector 100 and a discharging port 13 for discharging the air purified by the cyclone dust collector 100 may be provided in the main body 10. The discharging port 13 may communicate with a fan motor chamber (not shown) including the fan motor.

A mounting part (not shown) may be provided on the main body 10 so that the cyclone dust collector 100 is mounted on the main body. The cyclone dust collector 100 may be detachably mounted on the mounting part. The cyclone dust collector 100 separates dust from air suctioned by the suctioning part 21, collects the dust, and discharges the purified air through the discharging port 13.

Figure 2:
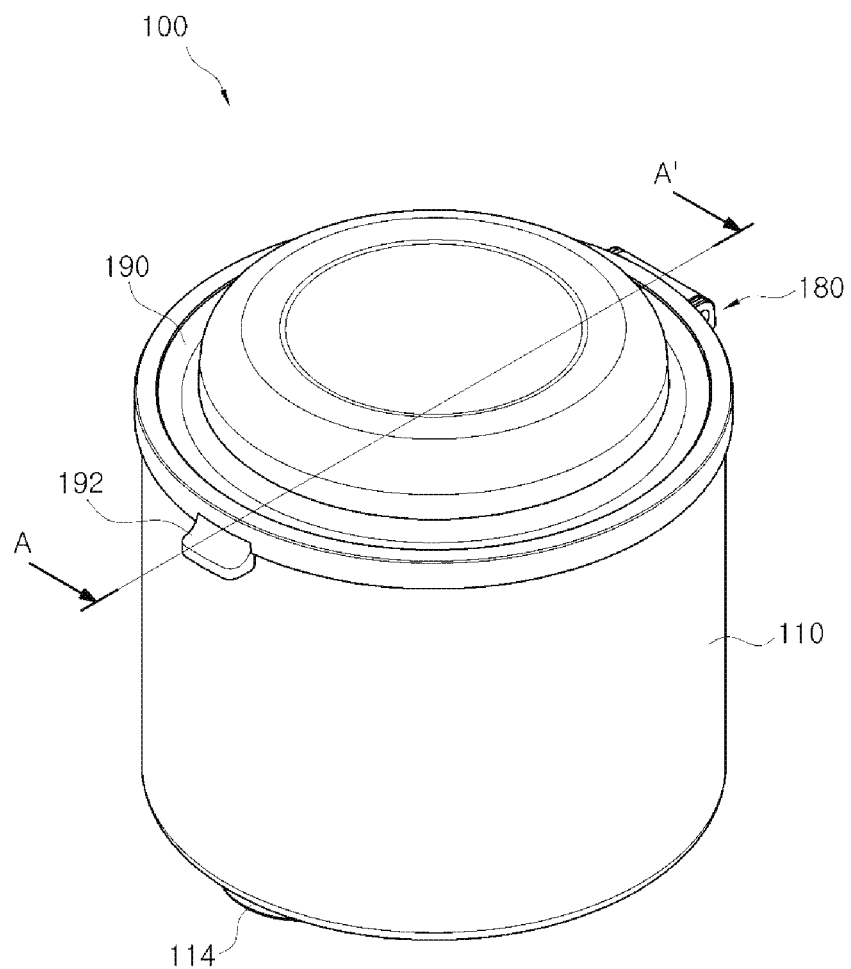
FIG. 2 illustrates a perspective view of the cyclone dust collector according to one embodiment of the present disclosure.
Figure 3:
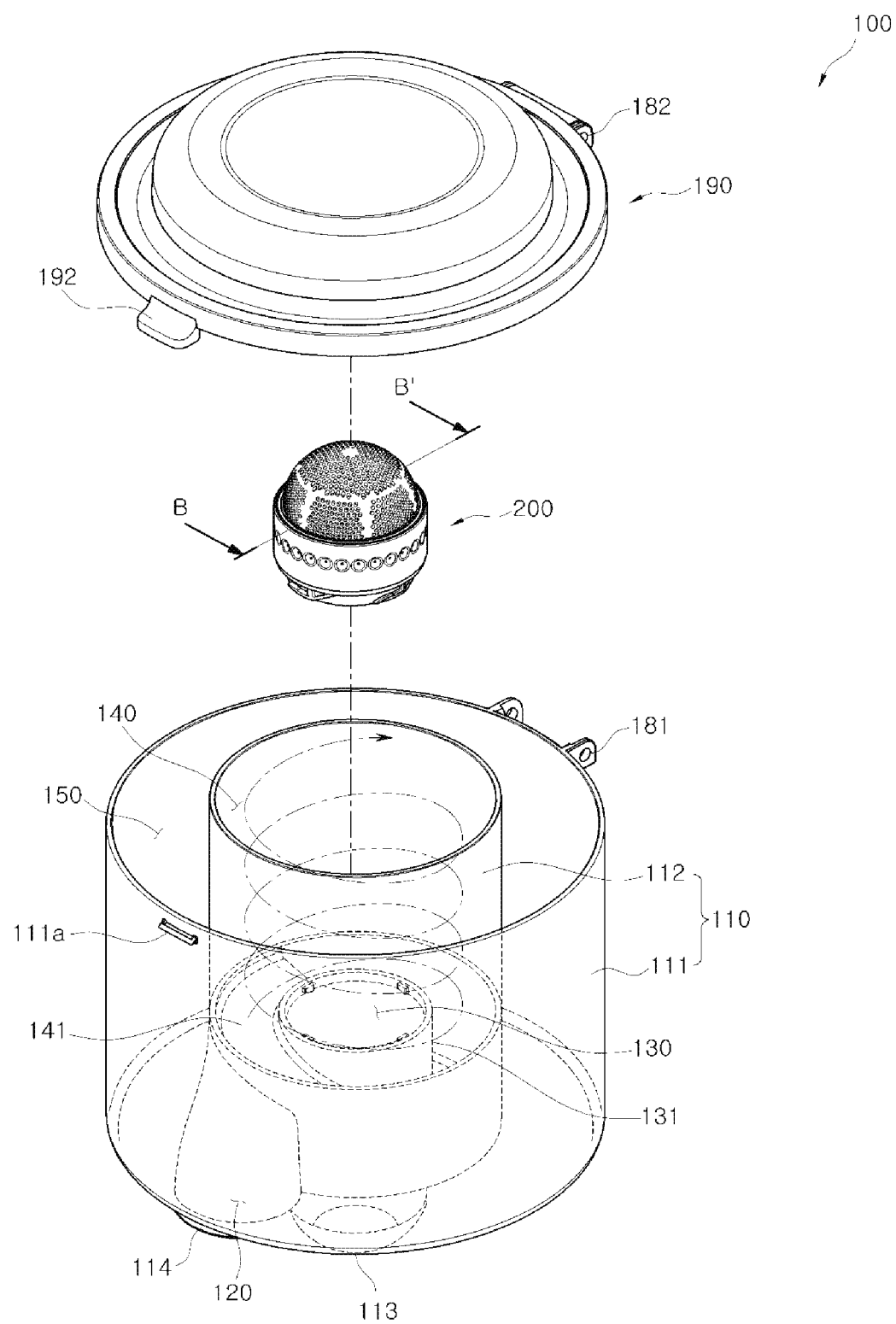
FIG. 3 illustrates an exploded perspective view of the cyclone dust collector according to one embodiment of the present disclosure.
Figure 4:
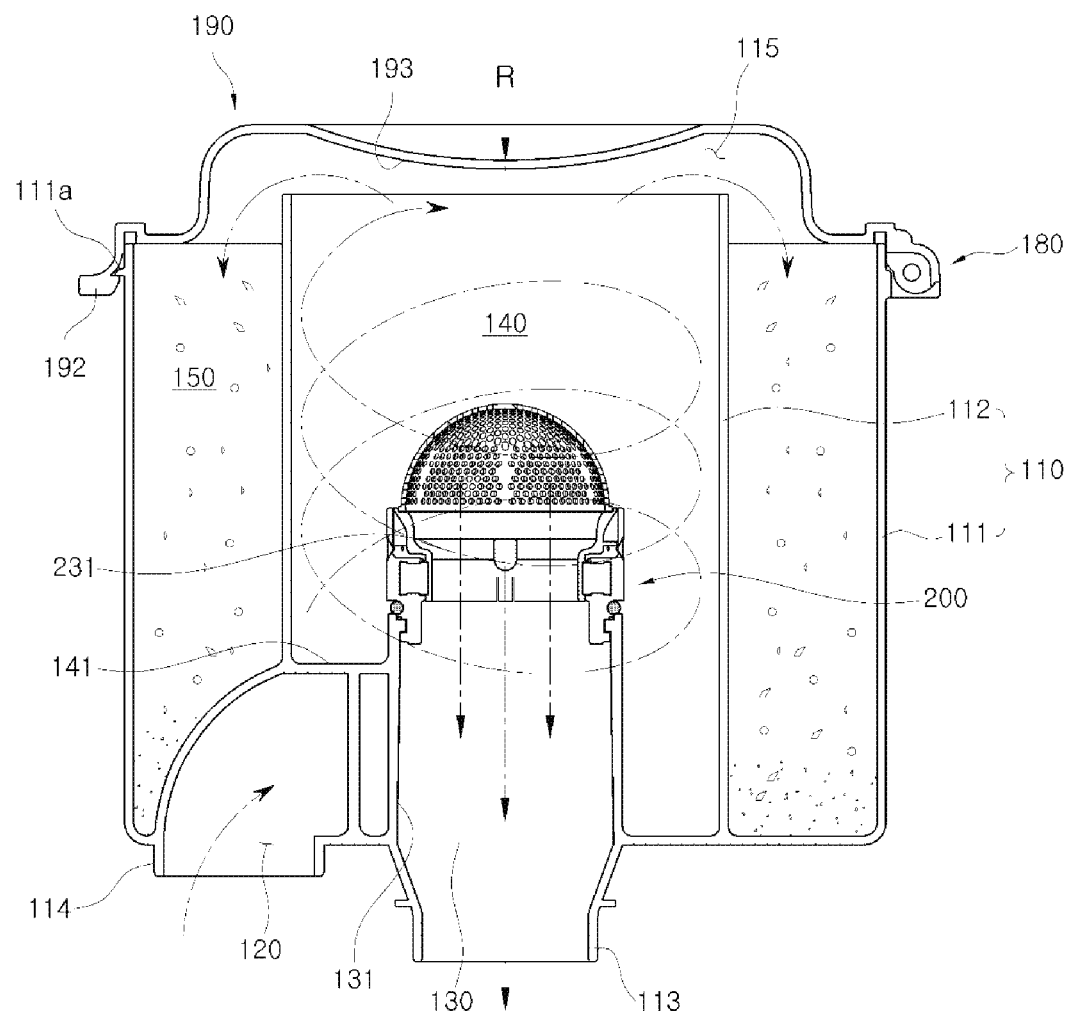
FIG. 4 illustrates a cross-sectional view of the cyclone dust collector according to one embodiment of the present disclosure as a partial cross-sectional view taken along line A-A' of FIG. 2 according to an embodiment of the present disclosure.

FIG. 2 illustrates a perspective view of the cyclone dust collector according to one embodiment of the present disclosure, FIG. 3 illustrates an exploded perspective view of the cyclone dust collector according to one embodiment of the present disclosure, and FIG. 4 illustrates a cross-sectional view of the cyclone dust collector according to one embodiment of the present disclosure as a partial cross-sectional view taken along line A-A' of FIG. 2 according to an embodiment of the present disclosure.

As shown in FIGS. 2 and 4, the cyclone dust collector 100 includes an inlet 114 into which air including dust is introduced and an outlet 113 from which purified air is discharged. When the cyclone dust collector 100 is mounted on the main body 10, the inlet 114 of the cyclone dust collector 100 may be connected to the suctioning port 12 of the main body 10, and the outlet 113 of the cyclone dust collector 100 may be connected to the discharging port 13 of the main body 10.

The cyclone dust collector 100 may include a cyclone body 110 having a cylindrical shape with an open upper surface and a cover 190 provided on the cyclone body 110. The cover 190 may be coupled to the cyclone body 110 with a hinge member 180. The cover 190 may be detachably coupled to the cyclone body 110. A hinge shaft accommodating part 181 is provided at the cyclone body 110, and a hinge shaft 182 may be provided at the cover 190 to correspond to the hinge shaft accommodating part 181.

A grip 192 may be provided at one side of the cover 190 so that a user readily separates the cover 190 from the cyclone body 110. The grip 192 of the cover 190 may be disposed at a location opposite the hinge shaft 182.

Meanwhile, the cyclone body 110 and the cover 190 may be made of a transparent material so that an amount of dust collected inside the cyclone dust collector 100 can be confirmed from the outside. At least a part of the cyclone body 110 and the cover 190 may be made of a transparent or opaque material.

A cyclone chamber 140 which forms a whirling air current such that dust is separated from air by centrifugal force and a dust collecting chamber 150 for collecting dust may be provided inside the cyclone body 110. The cyclone chamber 140 and the dust collecting chamber 150 may be partitioned by an inner wall 112. The cyclone chamber 140 may be provided at an inner side of the inner wall 112, and the dust collecting chamber 150 may be provided between the inner wall 112 and an outer wall 111. An exterior of the cyclone body 110 may be formed by the outer wall 111.

An opening 115 may be provided at an upper part of one side of the inner wall 112 to communicate the cyclone chamber 140 with the dust collecting chamber 150 so that the dust separated from the air in the cyclone chamber 140 may flow into the dust collecting chamber 150. The opening 115 may be formed at a side of an outer circumference of the cyclone chamber 140 because dust having a weight heavier than air spreads outward due to centrifugal force.

The cyclone chamber 140 may be formed to have a cylindrical shape to generate a whirling air current, and a spiral part 141 formed to be inclined in a spiral shape may be provided at the periphery of the cyclone chamber 140 in order to guide the whirling air current. The air may be guided along the spiral part 141 to whirl around the periphery of the cyclone chamber 140.

Meanwhile, a guide 193 for guiding dust which moves to the dust collecting chamber 150 by the whirling air current of the cyclone chamber 140 may be formed at a bottom surface of the cover 190. The center of the cover 190 is recessed downward so that the guide 193 is formed to have an inclination toward an outer side thereof. The guide 193 may be formed to have a curved surface $1t$. The air and dust guided by the guide 193 of the cover 190 may be guided to the outer side of the cover 190 and moved to the dust collecting chamber 150.

The user may separate the cover 190 from the cyclone body 110 and then remove the dust collected in the dust collecting chamber 150.

A fixing protrusion 111*a* formed to be coupled to the grip 192 of the cover 190 may be formed at the cyclone body 110.

An inlet part 120 through which air is introduced into the cyclone chamber 140 and an outlet part 130 through which air is discharged from the cyclone chamber 140 may be provided in the cyclone dust collector 100. The inlet part 120 and the outlet part 130 may be formed at a bottom surface of the cyclone body 110. The outlet part 130 may be located in the center of the bottom surface of the cyclone body 110, and the inlet part 120 may be eccentrically located from the center of the bottom surface of the cyclone body 110 toward one side thereof.

The inlet part 120 may communicate with the inlet 114 of the cyclone dust collector 100, and the outlet part 130 may communicate with the outlet 113 of the cyclone dust collector 100.

Air introduced from the inlet 114 of the cyclone dust collector 100 may enter the cyclone chamber 140 through the inlet part 120. The air from which dust is removed at the inside of the cyclone dust collector 100 may be discharged to the outside through the outlet part 130 of the cyclone chamber 140.

The outlet part 130 may include a cylindrical shape having a certain space therein. A grill assembly 200 for filtering dust from purified air from which dust has been primarily removed by centrifugal force may be provided at the outlet part 130. The grill assembly 200 may be provided at a discharge pipe 131. The discharge pipe 131 may communicate with the outlet part 130.

The grill assembly 200 may include a grill a rotor 230 on which the grill 220 is rotatably mounted, a case 210 in which the rotor 230 is rotatably accommodated, and a bearing 240 provided between the case 210 and the rotor 230. Air from which foreign matter is filtered by the grill 220 may be discharged from the cyclone dust collector 100 through the outlet part 130. A detailed configuration of the grill assembly 200 will be described below.

Hereinafter, an operation of the vacuum cleaner according to one embodiment of the present disclosure will be described.

When the fan motor of the main body 10 is operated, air on the surface to be cleaned may be suctioned by the suctioning part 21 with a suctioning force of the fan motor. The suctioned air may sequentially pass through the extension pipe 20, the handle 30, and the flexible hose 23 and may be introduced into the cyclone dust collector 100 mounted on the main body 10.

The air introduced into the cyclone dust collector 100 may be guided to the cyclone chamber 140 through the inlet part 120. The air guided to the cyclone chamber 140 may rise while being whirled by the spiral part 141 inside the cyclone chamber 140.

Dust having a weight heavier than air spreads outward in a radial direction due to centrifugal force and is introduced into the dust collecting chamber 150 through the opening 115 located at the top of the cyclone chamber 140. Here, the dust may be guided by the guide 193 formed at the cover 190. The dust introduced into the dust collecting chamber 150 may fall by gravity and may be collected in the dust collecting chamber 150.

The air from which the dust is primarily removed with centrifugal force passes through the grill assembly 200 so that dust having a predetermined size or greater may be filtered secondarily.

The air passed from the grill assembly 200 may be guided downward through the discharge pipe 131 and the outlet part 130. The air which is finally cleaned may be discharged from the cyclone dust collector 100 through the outlet part 130 and the outlet 113, and pass through the fan motor to be discharged to the outside of the main body 10. Although not illustrated in the drawings, a filter for filtering dust in the air discharged to the outside of the main body 10 may be further provided in the outlet 113.

Figure 5:
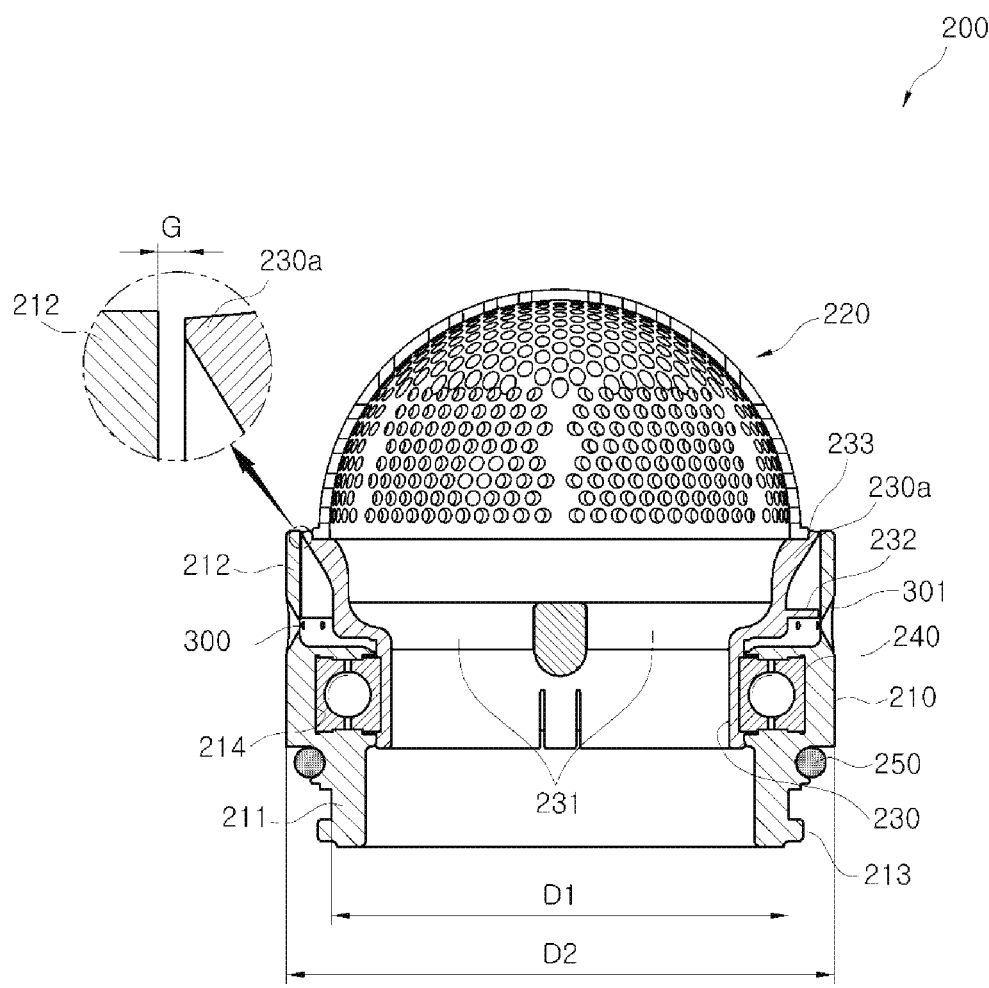
FIG. 5 illustrates a view of a grill assembly coupled to an outlet part according to one embodiment of the present disclosure.
Figure 6:
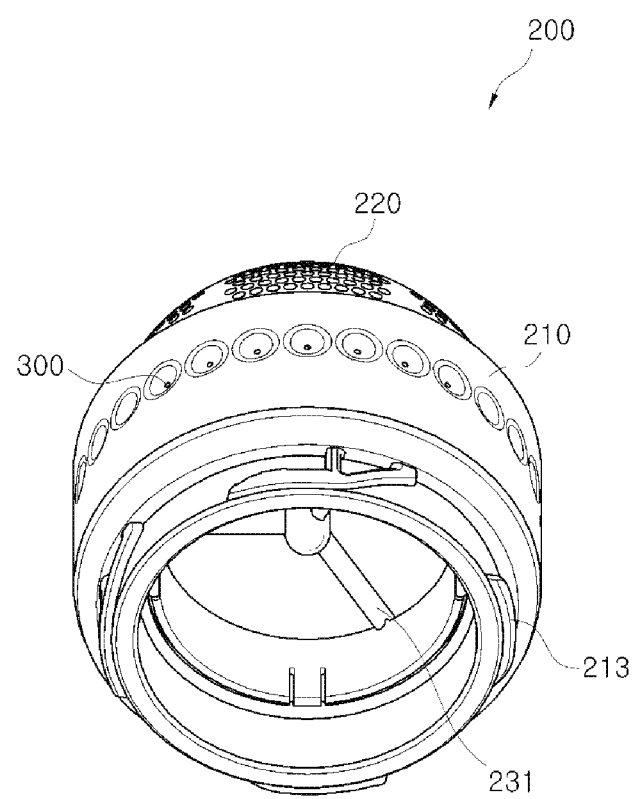
FIG. 6 illustrates a bottom perspective view of the grill assembly according to one embodiment of the present disclosure.
Figure 7:
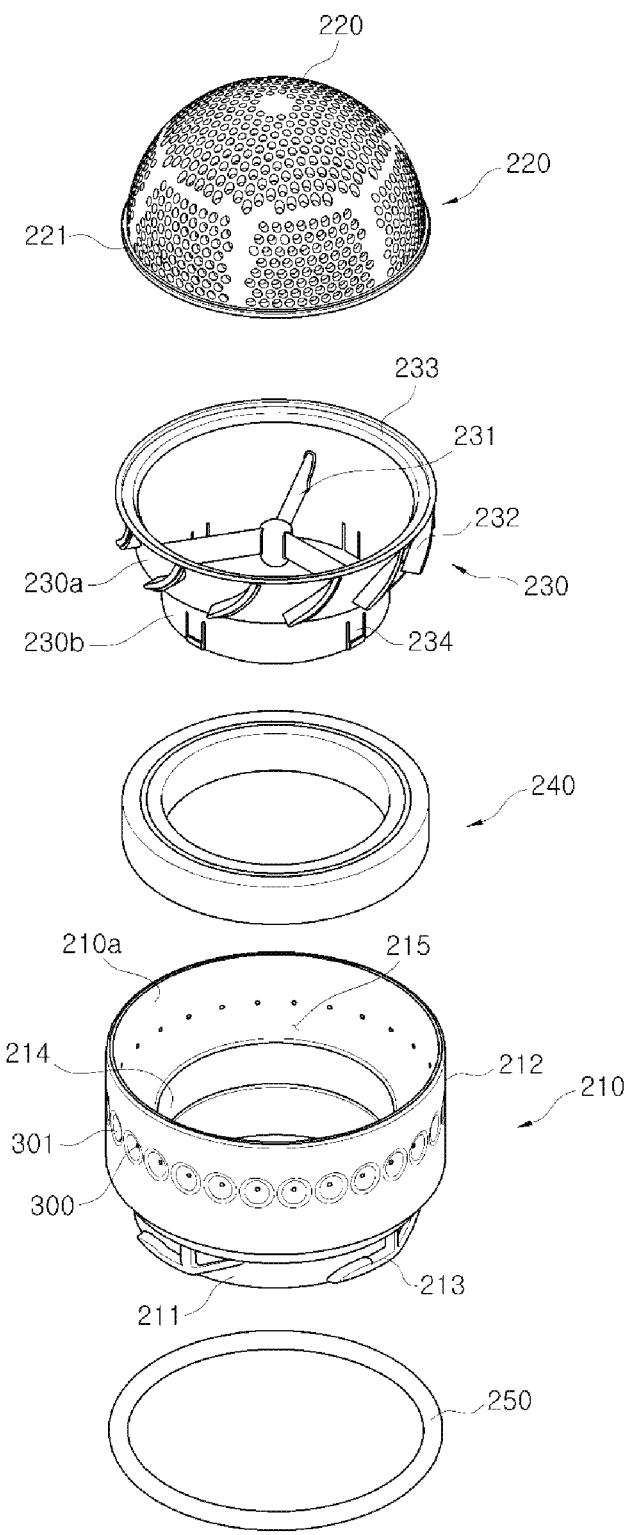
FIG. 7 illustrates an exploded perspective view of the grill assembly according to one embodiment of the present disclosure.
Figure 8:
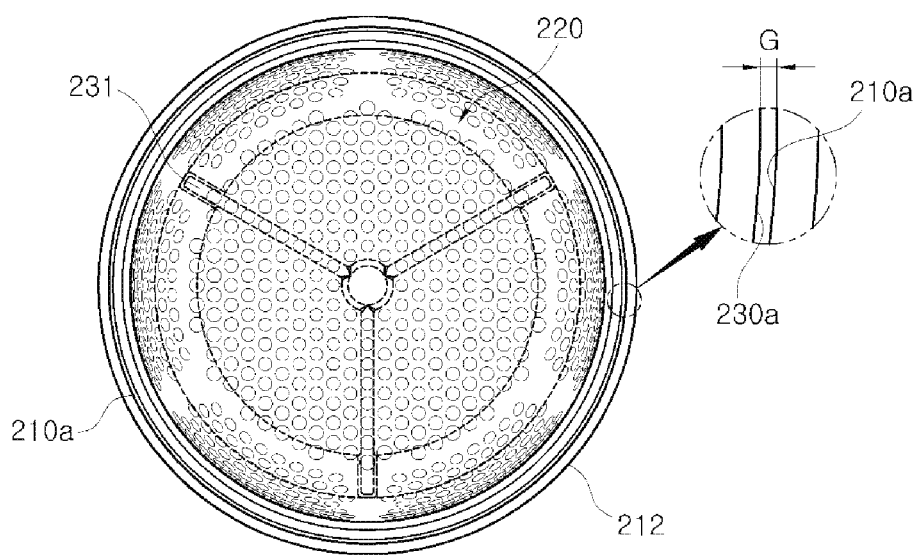
FIG. 8 illustrates a front view of the grill assembly according to one embodiment of the present disclosure.
Figure 9:
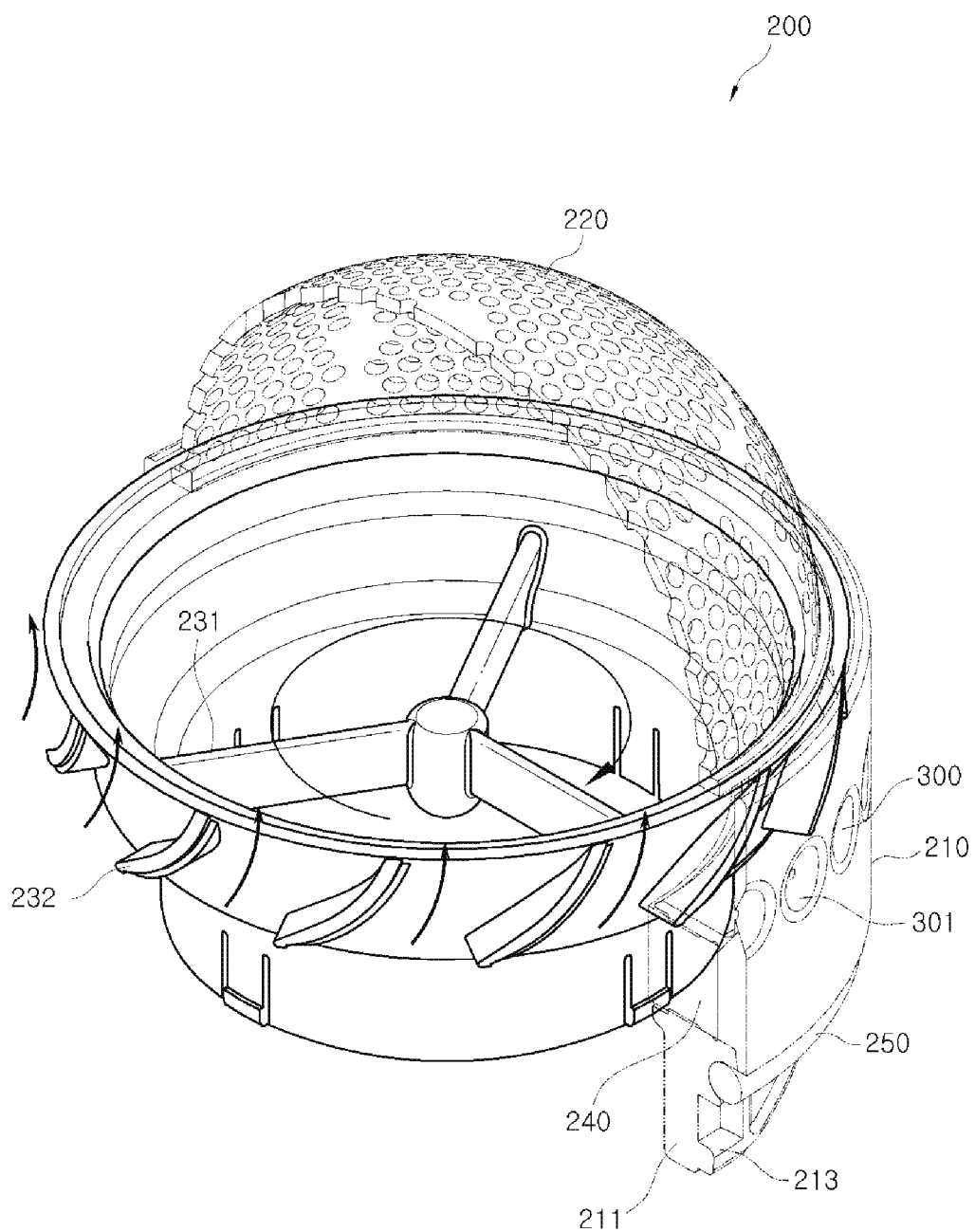
FIG. 9 illustrates a view of an air flow according to an operation of a rotor of the grill assembly according to one embodiment of the present disclosure.
Figure 10:
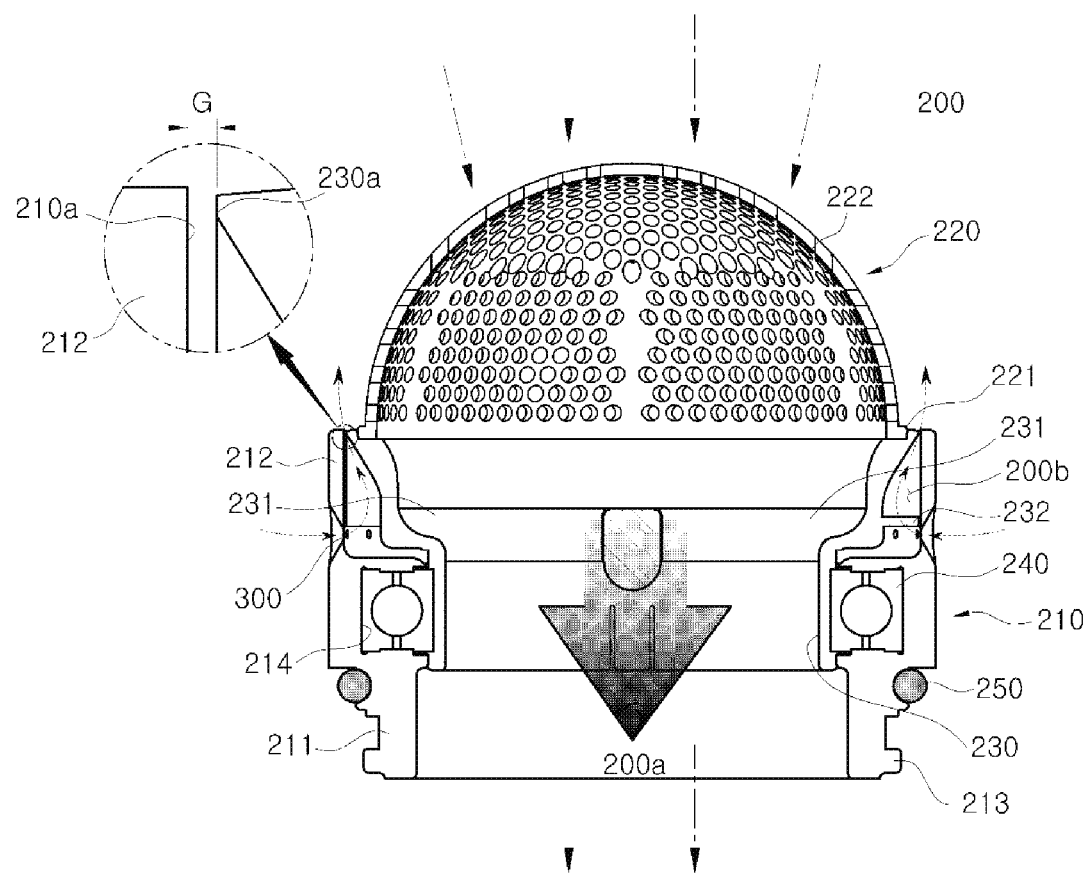
FIG. 10 illustrates a view of an air flow of the grill assembly according to one embodiment of the present disclosure as a partial cross-sectional view taken along line B-B' of FIG. 3 according to an embodiment of the present disclosure.

FIG. 5 illustrates a view of the grill assembly coupled to the outlet part according to one embodiment of the present disclosure, FIG. 6 illustrates a bottom perspective view of the grill assembly according to one embodiment of the present disclosure, FIG. 7 illustrates an exploded perspective view of the grill assembly according to one embodiment of the present disclosure, FIG. 8 illustrates a front view of the grill assembly according to one embodiment of the present disclosure, FIG. 9 illustrates a view of an air flow according to an operation of the rotor of the grill assembly according to one embodiment of the present disclosure, and FIG. 10 illustrates a view of an air flow of the grill assembly according to one embodiment of the present disclosure as a partial cross-sectional view taken along line B-B' of FIG. 3 according to an embodiment of the present disclosure.

As shown in FIGS. 5 to 10, the grill assembly 200 may be provided at the outlet part 130 of the cyclone dust collector 100. The grill assembly 200 is mounted on the discharge pipe 131 so that dust with a predetermined size or greater in the air may be filtered by the grill assembly. The air from which dust is filtered by the grill assembly 200 is guided to the outlet 113 of the cyclone dust collector 100 through the discharge pipe 131 and the outlet part 130.

The grill assembly 200 is provided to be rotatable by a suction force of the fan motor. The grill assembly 200 may include the grill 220, the rotor 230 on which the grill 220 is rotatably mounted, the case 210 in which the rotor 230 is rotatably accommodated, and the bearing 240 provided between the case 210 and the rotor 230.

The rotor 230 may be rotatably mounted on the case 210. The grill 220 may be mounted on the rotor 230 and rotate with the rotor 230.

The case 210 may be mounted on the discharge pipe 131. The case 210 may be formed to correspond to a shape of the discharge pipe 131. According to the embodiment of the present disclosure, the discharge pipe 131 is provided to have a cylindrical shape so that the case 210 may be formed to have a cylindrical shape. The grill assembly 200 may be detachably mounted at the discharge pipe 131, which allows cleaning or replacement of the grill assembly.

The case 210 may include a first case 211 and a second case 212. The first case 211 is formed to be coupled to the discharge pipe 131.

The first case 211 may be coupled to the discharge pipe 131 by a coupling protrusion 213 provided at a lower end of the first case 211. A coupling groove 133 corresponding to the coupling protrusion 213 may be formed in the discharge pipe 131. It is exemplified that the case 210 is coupled by the coupling protrusion 213 formed on the first case 211 and the coupling groove 133 of the discharge pipe 131 in accordance with the embodiment of the present disclosure, however, the concept of the present disclosure is not limited to the embodiment. For example, the case may be coupled to the discharge pipe using various ways for being detachable such as a fastening member, forcibly inserting, or screw coupling.

The first case 211 and the second case 212 may be formed to have a step therebetween. The second case 212 may be formed to extend upward from the first case 211. A rotor accommodating part 215 in which the rotor 230 is rotatably accommodated may be provided inside the second case 212.

A second diameter $D2$ of the second case 212 may be provided to be greater than a first diameter $D1$ of the first case 211.

The first case 211 may be inserted into the discharge pipe 131. Therefore, the first diameter of the first case 211 may be formed to be smaller than or equal to an inner diameter $D3$ of the discharge pipe 131.

A sealing member 250 may be provided between the first case 211 and the discharge pipe 131. The sealing member 250 may be formed to have a ring shape. The sealing member 250 may be fitted onto an outer circumferential surface of the first case 211. The case 210 may be coupled to the discharge pipe 131 in a state in which the sealing member 250 is coupled to the outer circumferential surface of the first case 211. The sealing member 250 prevents a gap from occurring between the discharge pipe 131 and the first case 211, and fixes the first case 211 inserted in the discharge pipe 131 to prevent the first case 211 from being separated from the discharge pipe 131. The sealing member 250 may include a rubber or silicone material.

The second diameter $D2$ of the second case 212 may be formed to be greater than or equal to a diameter of an outer circumferential surface of the discharge pipe 131. The rotor accommodating part 215 in which the rotor 230 is rotatably accommodated may be provided inside the second case 212.

Holes 300 are formed in the second case 212. The holes 300 of the second case 212 include a plurality of holes. The holes 300 are formed in a circumferential surface of the second case 212. The plurality of holes 300 may be disposed to be spaced apart from each other at regular intervals in the circumferential surface of the second case 212. The holes 300 may be disposed to communicate with the rotor accommodating part 215 inside the second case 212. The holes 300 may be disposed to be spaced apart from each other at regular intervals in an outer circumferential surface of the second case 212. Hole guides 301 which are recessed inward may be formed at a periphery of the plurality of the holes 300 so that external air is suitably introduced into the holes. The holes 300 may be formed at the center of the hole guides 301. Air outside the case 210 may be introduced into the rotor accommodating part 215 inside the case 210 through the plurality of holes 300.

A bearing mounting part 214 on which the bearing 240 allowing the rotor 230 to be rotatable is mounted is provided in the first case 211. The bearing mounting part 214 is provided inside the first case 211.

One side of the bearing 240 may be supported by the bearing mounting part 214 of the case 210, and the other side of the bearing 240 may be supported by the rotor 230.

The rotor 230 is provided to be rotatable by the bearing 240 provided between the case 210 and the rotor 230.

The rotor 230 may include a first rotor 230a provided to be coupled to the grill 220 and a second rotor 230b extending downward from the first rotor 230a. The first rotor 230a and the second rotor 230b may be formed to have a step therebetween. A first fan 231 may be formed inside the first rotor 230a. The first fan 231 is provided to form a flow of air when the rotor 230 is rotated. The first fan 231 may be formed to extend in all directions from the center of the rotor 230. In the embodiment of the present disclosure, it is exemplified that the first fan 231 is formed to have three wings with an interval of 120 degrees, however, the concept of the present disclosure is not limited thereto. For example, the number of wings of the first fan may be formed to be 3 or less or 3 or more. Furthermore, it is exemplified that the first fan 231 is disposed perpendicular to a bottom of the rotor 230, however, the first fan may include an inclination.

In the first fan 231, when the fan motor generates a suction force, the rotor 230 may be rotated in one direction by the first fan 231. A flow direction of air caused by the rotation of the first fan 231 may be provided such that an air flow caused by the suction force by the fan motor is not disturbed. Air caused by the rotation of the first fan 231 may flow to a main flow path 200a which is formed between the grill 220 and the outlet part 130 and by which the air introduced to a side of the first fan 231 is discharged through the outlet part 130.

A second fan 232 may be formed at an outer surface of the first rotor 230a. The second fan 232 may be provided to disturb a flow of air caused by the first fan 231. When a suction force is generated by the fan motor, the second fan 232 may flow air from the discharge pipe 131 to the cyclone chamber 140. That is, the second fan 232 may generate an air flow in a direction opposite a direction of the air flow caused by the suction force of the fan motor. A plurality of second fans 232 may be formed to be spaced apart from each other at regular intervals on an outer surface of the first rotor 230a. The second fat 232 may be a side fan which is provided at a side surface of the rotor 230.

A bearing coupling part 234 to which the bearing 240 is coupled may be formed at the second rotor 230b. The bearing coupling part 234 may be provided such that the rotor 230 is rotatable by the bearing 240.

A grill mounting part 233 to which the grill 220 is coupled may be provided at a circumference of an upper end of the first rotor 230a. The grill mounting part 233 is formed to have a circular shape and fixes and supports the grill 220 so that the grill 220 is not separated when the rotor 230 is rotated.

The grill 220 may be formed to have a hemispheric shape. The grill 220 may be provided to include the plurality of holes 300. A circumference of a lower end of the grill 220 may be formed to have a circular shape. A grill coupling part 221 having a shape formed to be coupled to the grill mounting part 233 may be formed at the lower end of the grill 220. The grill coupling part 221 is coupled to the grill mounting part 233 of the rotor 230 so that the grill 220 is fixed. The grill 220 coupled to the rotor 230 may be rotated together with the rotor 230.

Meanwhile, a gap G with a predetermined distance may be formed between the case 210 and the grill 220 such that the grill 220 is rotated together with the rotor 230. The gap G may be formed between the rotor 230 on which the grill 220 is mounted and the case 210. The gap G may be formed between an outer circumference of the upper end of the first rotor 230a of the rotor 230 to which the grill 220 is coupled and an inner surface 210a of the second case 212.

When the grill 220 is rotated by a suction force generated by the fan motor, air flows to the main flow path 200a at the grill 220, and foreign matter such as hair may stick between the grill 220 which is rotated and the case 210.

The foreign matter such as hair may interfere with the rotation of the grill 220. Here, a dust removal flow path 200b may be formed such that air which is introduced from the plurality of holes 300 formed in the second case 212 is discharged through the gap G.

The air discharged through the dust removal flow path 200b allows dust or foreign matter stuck to the grill 220 in the hemispheric shape to fall from the grill by centrifugal force.

The air introduced from the plurality of holes 300 from the outside of the case 210 is discharged to the gap G through the dust removal flow path 200b so that the grill 220 is prevented from being unable to rotate.

As shown in FIG. 10, an operation of the grill assembly 200 is described.

The grill assembly 200 is provided with the grill 220 and the rotor 230 which are rotatable so that dust and foreign matter on a surface of the grill 220 fall from the grill by centrifugal force.

When a suction force is generated by the fan motor, the rotor 230 and the grill 220 may be integrally rotated. The main flow path 200a is formed such that the air from which dust is filtered by a whirling air current of the cyclone chamber 140 passes through the grill 220 and flows to the discharge pipe 131.

Here, the main flow path 200a may be formed to extend from top to bottom such that the air introduced from the grill 220 is discharged to the discharge pipe 131.

Meanwhile, an air flow in a direction opposite the main flow path 200a is formed by the second fan 232 between the second fan 232 of the rotor 230 and the case 210. The air flow in a direction opposite a direction of an air flow caused by the suction force of the fan motor is generated in the gap G between the second fan 232 of the rotor 230 on which the grill 220 is mounted and the case 210 such that an air flow caused by the suction force of the fan motor is interfered with.

The plurality of holes 300 formed in the case 210 are provided such that outside air is introduced between the second fan 232 and the case 210. The outside air introduced between the second fan 232 and the case 210 is discharged through the gap G of the dust removal flow path 200b, and therefore, dust and foreign matter such as hair stuck to the surface of the grill 220 and the gap G may be removed.

The grill 220 according to the embodiment of the present disclosure is provided to have a hemispheric shape and be rotatable so that dust and foreign matter such as hair stuck to the surface of the grill 220 may fall from the grill by rotation of the grill 220 and centrifugal force. The grill 220 having the hemispheric shape may expand an area through which air passes and prevent the suction force caused by the fan motor from being decreased.

Meanwhile, the fallen dust may be collected by the dust collecting chamber 150 while being rotated by a whirling air flow of the cyclone chamber 140.

Therefore, because the grill 220 is rotatably provided, a suction force of the vacuum cleaner 1 is prevented from being decreased and an efficiency of cleaning can be improved. Furthermore, because dust does not stick to the surface of the grill 220, the dust inside the cyclone dust collector 100 can be readily removed. Because the user separates the cyclone dust collector 100 from the main body 10, opens the cover 190, and throws out only the dust collected in the dust collecting chamber 150, the user can clean the cyclone dust collector 100 easily and simply.

Furthermore, dust is not introduced through the gap G between the grill 220 and the case 210, and foreign matter such as dust, hair, and the like may be prevented from being caught in the gap G between the grill 220 and the case 210.

Figure 11:
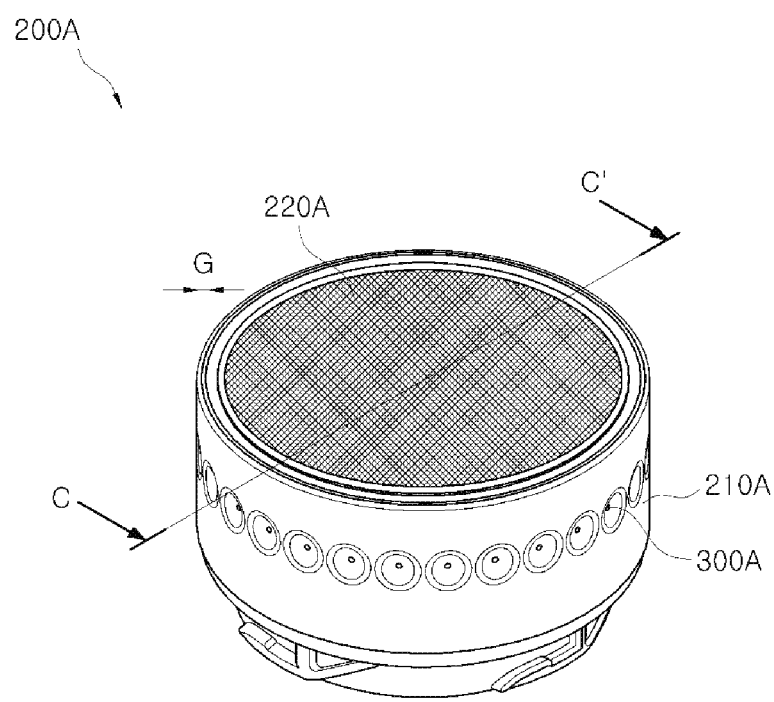
FIG. 11 illustrates a perspective view of a grill assembly according to another embodiment of the present disclosure.
Figure 12:
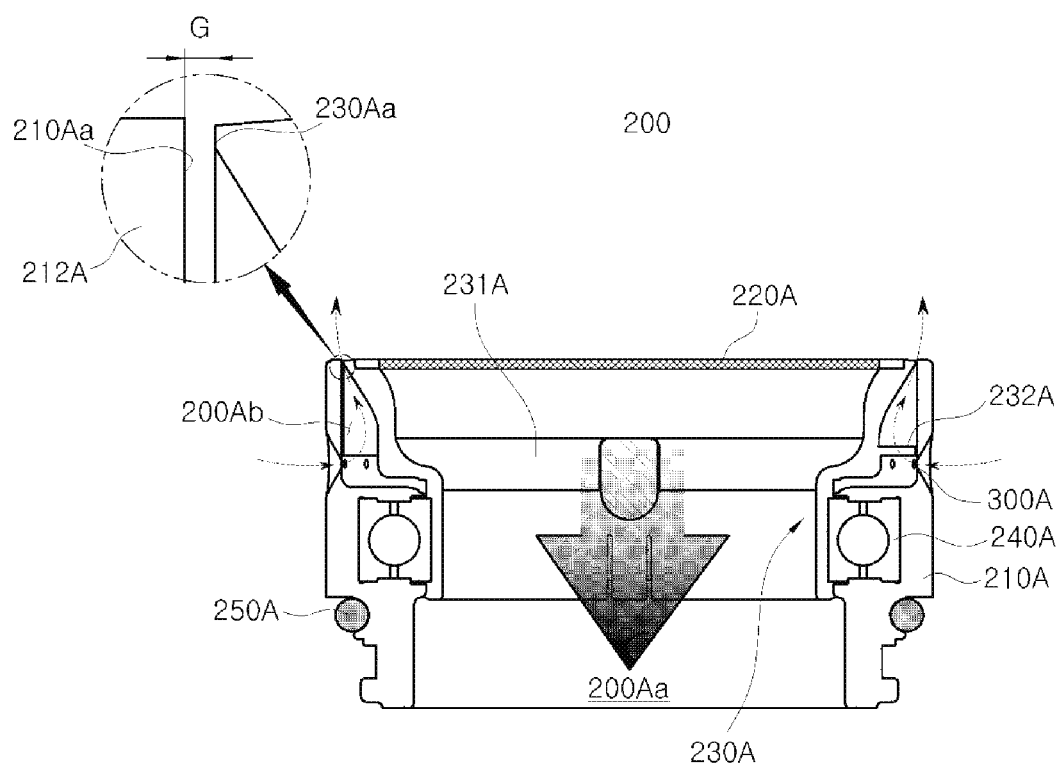
FIG. 12 illustrates a view of an air flow of the grill assembly according to another embodiment of the present disclosure as a partial cross-sectional view taken along line C-C' of FIG. 11 according to an embodiment of the present disclosure.

FIG. 11 illustrates a perspective view of a grill assembly according to another embodiment of the present disclosure, and FIG. 12 illustrates a view of an air flow of the grill assembly according to another embodiment of the present disclosure as a partial cross-sectional view taken along line C-C' of FIG. 11 according to an embodiment of the present disclosure. Reference numerals, which are not shown in the drawings, will be understood with reference to FIGS. 1 to 10.

As shown in FIGS. 11 and 12, a grill assembly 200A may include a grill 220A having a planar shape. In the embodiment of the present disclosure, it is exemplified that the grill 220A has a hemispheric or planar shape, however, the concept of the present disclosure is not limited thereto. The grill may include at least one of a hemispheric shape, a conical shape, a circular shape, a planar shape, and a cylindrical shape.

The grill 220A may include a circular plate in which a plurality of holes are provided. The grill 220A may be coupled to a rotor 230A and rotatably provided. The rotor 230A may be rotatably accommodated in a case 210A. A bearing 240A is provided between the rotor 230A and the case 210A so that the rotor 230A is rotatable.

The rotor 230A may include a first fan 231A disposed inside the rotor 230A and a second fan 232A disposed at an outer surface of the rotor 230A.

When the rotor 230A is rotated by a suction force of a fan motor, a main flow path 200Aa through which air is introduced to the first fan 231A is formed. The main flow path 200Aa is formed to be a flow path by which the air introduced to the first fan 231A through the grill 220A is discharged through the discharge pipe 131.

Here, an air flow generated by the second fan 232A may be generated as an air flow in a direction opposite the main flow path 200Aa. A dust removal flow path 200A1 may be formed such that air introduced from a plurality of holes 300A formed in an outer surface of the case 210A is discharged in a direction opposite the main flow path 200Aa, that is, through a gap G which is formed between the case 210A and the grill 220A.

The dust removal flow path 200Ab may be formed between the plurality of holes 300A of the case 210A and the gap G. Air introduced from the plurality of holes 300a is discharged through the gap G between the grill 220A and the case 210A by the second fan 232A, and therefore, dust and hair may be prevented from being caught or stuck between the grill 220A and the case 210A.

Duplicate descriptions of configurations will be omitted because the detailed configuration and operation of the grill assembly 200A according to the above configurations are sufficiently predictable.

As is apparent from the above description, a vacuum cleaner has a simplified structure, thereby reducing production costs thereof and improving productivity thereof.

Further, usability of a cyclone dust collector and a vacuum cleaner having the same can be improved.

Furthermore, a suction force can be improved because foreign matter does not stick to an outer circumferential surface of a grill.

In the above descriptions, particular embodiments have been illustrated and described. However, the disclosure is not limited to the above embodiments, and thus it is apparent to those skilled in the art that various modifications, additions and substitutions are possible, without departing from the scope and spirit of the disclosure as disclosed in the accompanying claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A vacuum cleaner comprising a cyclone dust collector, the cyclone dust collector includes:
    a cyclone chamber configured to whirl air introduced from an inlet part to separate dust from the air and including an outlet part provided to discharge the air, from which dust is separated, from the cyclone chamber;
    a grill rotatably provided at the outlet part;
    a rotor including a first fan on which the grill is mounted and that is rotatably provided and a second fan configured to generate an air flow in a direction opposite an air flow direction of the first fan;
    a case in which the rotor is rotatably accommodated; and
    a gap provided between the grill and the case,
    wherein a plurality of holes are formed in the case, and the case includes a dust removal flow path formed to discharge air introduced from the plurality of holes through the gap.

2. The vacuum cleaner according to claim 1, wherein the plurality of holes are formed in an outer circumferential surface of the case.

3. The vacuum cleaner according to claim 1, further comprising a bearing provided between the case and the rotor.

4. The vacuum cleaner according to claim 3, wherein the case includes:
    a first case connected to the outlet part; and
    a second case configured to extend from the first case and provided so that the rotor is rotatably accommodated therein,
    wherein the plurality of holes are disposed in the second case.

5. The vacuum cleaner according to claim 1, wherein the cyclone chamber includes a main flow path formed between the grill and the outlet part and configured to discharge air introduced into the first fan.

6. The vacuum cleaner according to claim 5, wherein the main flow path and the dust removal flow path are separated from each other.

7. The vacuum cleaner according to claim 1, wherein the rotor is rotated by a suction force.

8. The vacuum cleaner according to claim 1, wherein the grill includes at least one of a hemispheric shape, a conical shape, a circular shape, a planar shape, and a cylindrical shape.

9. The vacuum cleaner according to claim 4, wherein the second case includes a bearing mounting part formed to mount the bearing.

10. The vacuum cleaner according to claim 3, wherein the rotor includes:
a first rotor to which the grill is coupled; and
a second rotor configured to extend from the first rotor and provided with the bearing at an outer side thereof,
wherein the second fan is disposed at an outer side of the first rotor.

11. The vacuum cleaner according to claim 10, wherein the second rotor includes a bearing coupling part formed to be coupled to the bearing.

12. The vacuum cleaner according to claim 1, wherein:
the cyclone chamber includes a cover provided openable and closable; and
the cover further includes a guide configured to guide dust that is separated by whirling air.

13. The vacuum cleaner according to claim 12, wherein the guide is formed to be inclined from a center of the guide to an outer side thereof as a center of the cover is more recessed than an edge of the cover.

14. The vacuum cleaner according to claim 1, wherein the cyclone chamber includes:
a discharge pipe that is connected to the outlet part; and
a sealing member provided to seal between the case and the discharge pipe.

15. A cyclone dust collector comprising:
a cyclone chamber configured to whirl air introduced from an inlet part to separate dust from the air and including an outlet part provided to discharge the air, from which dust is separated from, the cyclone chamber;
a grill rotatably provided at the outlet part;
a rotor including a first fan on which the grill is mounted and that is rotatably provided and a second fan configured to generate an air flow in a direction opposite an air flow direction of the first fan;
a case in which the or is rotatably accommodated and a plurality of holes are formed to introduce air;
a gap provided between the grill and the case;
a bearing provided between the case and the rotor; and
a dust removal flow path formed to discharge the air introduced from the plurality of holes through the gap.

16. The cyclone dust collector according to claim 15, wherein the case includes:
a first case connected to the outlet part; and
a second case configured to extend from the first case and provided with the rotor rotatably accommodated therein,
wherein the plurality of holes are disposed in the second case.

17. The cyclone dust collector according to claim 16, wherein:
the cyclone chamber includes a main flow path formed between the grill and the outlet part and configured to discharge air introduced into the first fan; and
the main flow path and the dust removal flow path are separated from each other.

18. The cyclone dust collector according to claim 15, wherein the grill includes at least one of a hemispheric shape, a conical shape, a circular shape, a planar shape, and a cylindrical shape.

19. The cyclone dust collector according to claim 16, wherein the rotor includes:
a first rotor to which the grill is coupled; and
a second rotor configured to extend from the first rotor and provided with the bearing at an outer side thereof,
wherein the second fan is disposed at an outer side of the first rotor.

20. The cyclone dust collector according to claim 15, wherein the cyclone chamber includes:
a discharge pipe connected to the outlet part; and
a sealing member configured to seal between the case and the discharge pipe.

* * * * *